(12) United States Patent
Sato

(10) Patent No.: US 12,434,632 B2
(45) Date of Patent: Oct. 7, 2025

(54) DISPLAY SYSTEM INCLUDING DISPLAY CONTROL UNIT AND OPTICAL DEVICE

(71) Applicant: Alps Alpine Co., LTD, Tokyo (JP)

(72) Inventor: Tetsuo Sato, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 493 days.

(21) Appl. No.: 17/974,029

(22) Filed: Oct. 26, 2022

(65) Prior Publication Data

US 2023/0140960 A1 May 11, 2023

(30) Foreign Application Priority Data

Nov. 8, 2021 (JP) .................................. 2021-181646

(51) Int. Cl.
*B60R 1/12* (2006.01)
*B60K 35/22* (2024.01)
(Continued)

(52) U.S. Cl.
CPC ................ *B60R 1/12* (2013.01); *B60K 35/22* (2024.01); *B60K 35/28* (2024.01); *B60K 35/29* (2024.01); *B60K 35/415* (2024.01); *B60K 35/60* (2024.01); *B60K 35/81* (2024.01); *B60R 1/088* (2013.01); *B60R 1/26* (2022.01); *G02F 1/13318* (2013.01); *B60K 2360/178* (2024.01); *B60K 2360/188* (2024.01); *B60K 2360/23* (2024.01); *B60K 2360/27* (2024.01); *B60K 2360/347* (2024.01); *B60K 2360/349* (2024.01);
(Continued)

(58) Field of Classification Search
CPC ............................ B60K 35/81; B60K 35/415; B60K 2360/349; B60K 2360/779; B60R 1/12; B60R 1/26; B60R 2001/1253; G02F 1/13318
See application file for complete search history.

(56) References Cited

U.S. PATENT DOCUMENTS

| 6,072,629 A * | 6/2000 | Fan ....................... G02B 5/3083 |
| | | 359/489.17 |
| 2009/0002575 A1 * | 1/2009 | Yamada .................. B60R 1/088 |
| | | 349/1 |

(Continued)

FOREIGN PATENT DOCUMENTS

| EP | 2 008 869 A1 | 12/2008 |
| EP | 3264169 A1 | 1/2018 |
| JP | 6624193 | 12/2019 |

OTHER PUBLICATIONS

Equal perceived brightness with different LED colors; website thread; Sep. 16, 2015 (Year: 2015).*

(Continued)

*Primary Examiner* — Keith G. Delahoussaye
(74) *Attorney, Agent, or Firm* — Crowell & Moring LLP

(57) ABSTRACT

A reflectance/transmittance of an optical device disposed at a position through which image light emitted from a liquid crystal display displaying an icon passes is changed according to an anti-glare level to achieve anti-glare of the reflected image. A color of the icon displayed on the liquid crystal display is adjusted such that the higher the transmittance of the optical device is, the lower the lightness is, so that the icon of a similar color is visually recognized regardless of the reflectance/transmittance of the optical device.

8 Claims, 6 Drawing Sheets

(51) Int. Cl.
 *B60K 35/28* (2024.01)
 *B60K 35/29* (2024.01)
 *B60K 35/40* (2024.01)
 *B60K 35/60* (2024.01)
 *B60K 35/81* (2024.01)
 *B60R 1/08* (2006.01)
 *B60R 1/26* (2022.01)
 *G02F 1/133* (2006.01)
 *G02F 1/1347* (2006.01)

(52) U.S. Cl.
 CPC .. *B60K 2360/693* (2024.01); *B60K 2360/779* (2024.01); *B60R 2001/1253* (2013.01); *B60R 2300/8026* (2013.01); *G02F 1/1347* (2013.01); *G02F 2201/58* (2013.01); *G02F 2203/48* (2013.01)

(56) References Cited

U.S. PATENT DOCUMENTS

| | | | |
|---|---|---|---|
| 2010/0201816 A1* | 8/2010 | Lee | B60R 1/12 |
| | | | 349/1 |
| 2014/0022390 A1 | 1/2014 | Blank et al. | |
| 2015/0062342 A1* | 3/2015 | Hoek | B60R 1/04 |
| | | | 348/148 |
| 2016/0375833 A1 | 12/2016 | Larson et al. | |
| 2022/0203898 A1* | 6/2022 | Warren | B60R 1/12 |
| 2022/0324385 A1* | 10/2022 | Li | B60R 1/088 |

OTHER PUBLICATIONS

Extended European Search Report from corresponding European patent application No. 22201449.0-1012, Mar. 21, 2023, 10 pgs.

\* cited by examiner

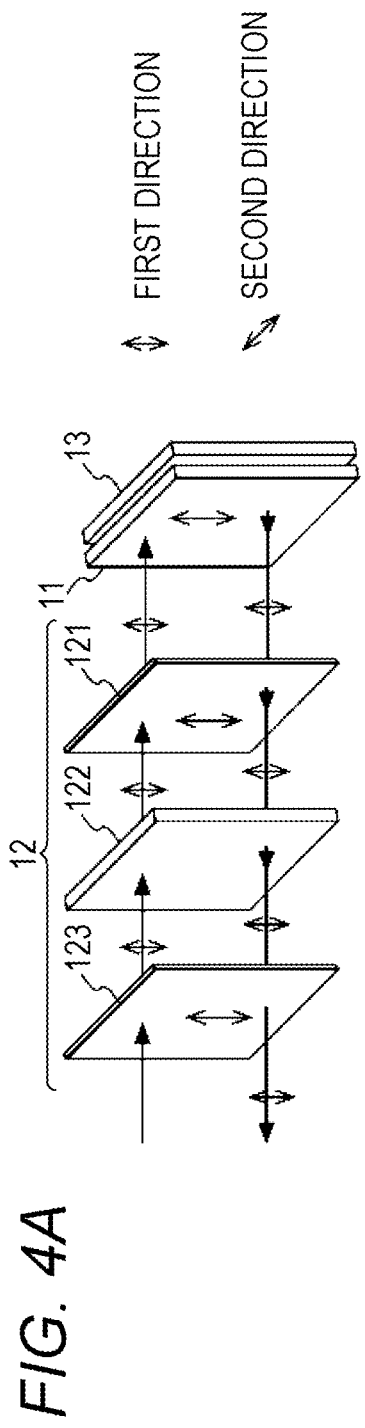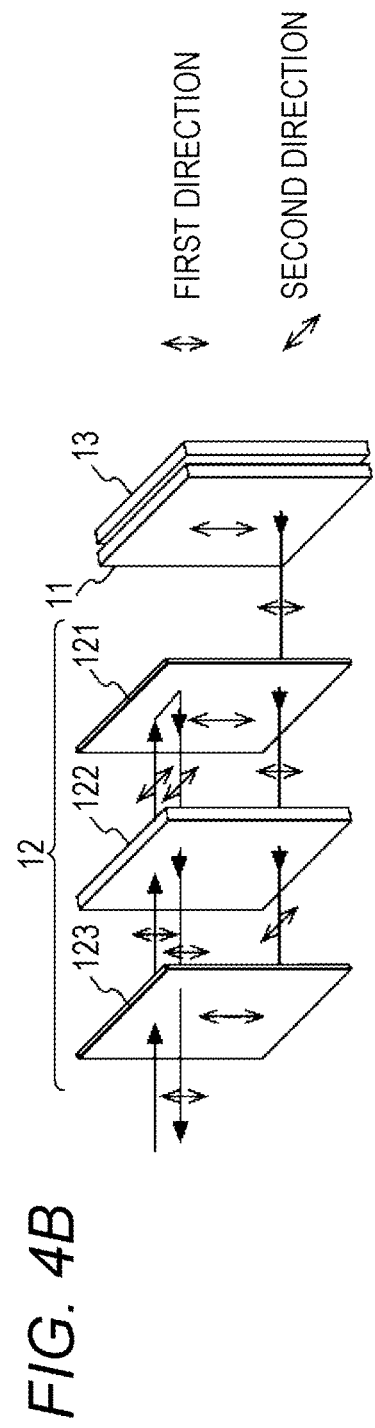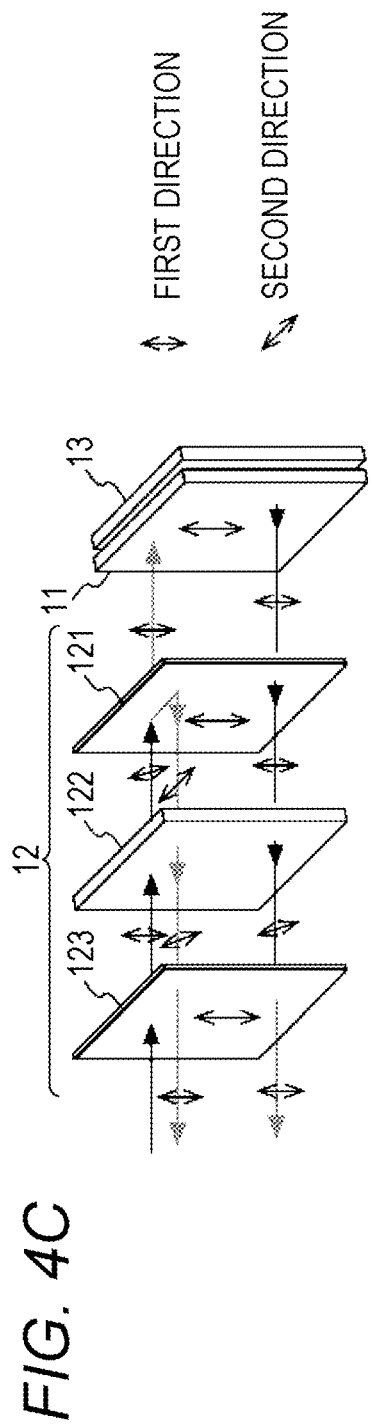

 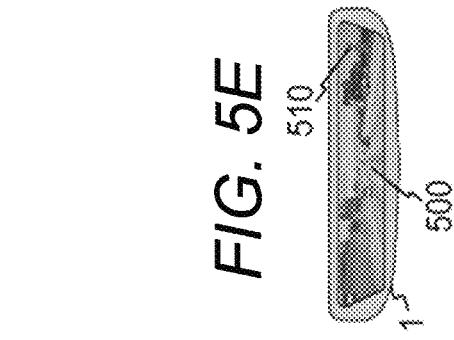 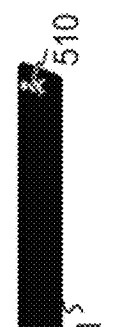 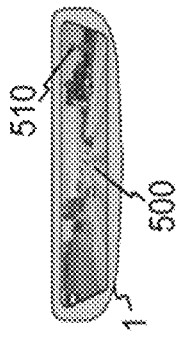 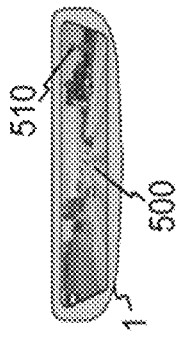 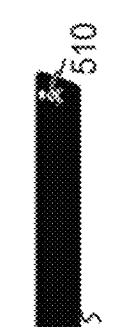 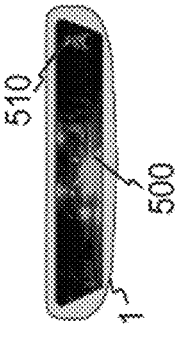 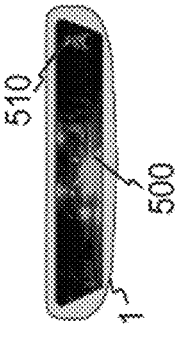 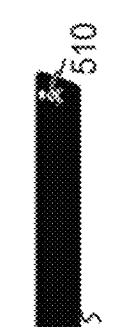 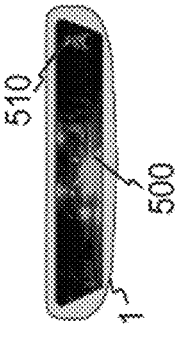 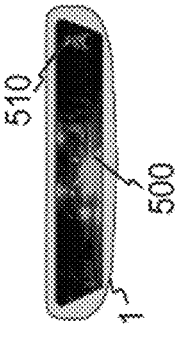 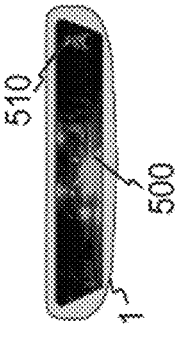

| BASIC DISPLAY COLOR = (R0, G0, B0) ||
|---|---|
| TRANSMITTANCE | CURRENT DISPLAY COLOR |
| 80% | (R1, G1, B1) |
| 40% | (R2, G2, B2) |
| 20% | (R3, G3, B3) |

DISPLAY SYSTEM INCLUDING DISPLAY CONTROL UNIT AND OPTICAL DEVICE

RELATED APPLICATION

The present application claims priority to Japanese Patent Application Number 2021-181646, filed Nov. 8, 2021, the entirety of which is hereby incorporated by reference.

BACKGROUND

1. Field of the Invention

The present invention relates to a display device that displays a reflected image as a mirror and a display image in a superimposed manner.

2. Description of the Related Art

Known examples of a display device for displaying a reflected image as a mirror and a display image in a superimposed manner include a display device in which an optical device capable of controlling reflectance/transmittance of incident light is disposed so as to face a screen of a liquid crystal display (e.g., refer to Japanese Patent No. 6624193). Here, the optical device controls the reflectance/transmittance by changing a rate of division of the incident light into reflected light and transmitted light. If the reflectance is increased, the transmittance is decreased, and if the reflectance is decreased, the transmittance is increased.

Thus, in the display device, the reflectance/transmittance is controlled appropriately so that the display image on the liquid crystal display can be displayed with the reflected image by the optical device in a superimposed manner.

It is conceivable to install, in a vehicle, the display device for displaying a display image with a reflected image as a mirror in a superimposed manner as described above, and to display information based on the display image on the liquid crystal display with a reflected image showing the rear view of the vehicle in a superimposed manner; thereby to use the display device as a rearview mirror with an information display function.

In this case, it is conceivable to, in response to intense light coming from behind such as a headlight of the following vehicle, reduce the reflectance of the optical device for anti-glare.

However, this also changes the reflectance/transmittance of the image light of the display image on the liquid crystal display of the optical device; therefore, even if the same image is displayed on the liquid crystal display, lightness of the image light emitted from the display device changes. This sometimes makes it difficult for the user to see information displayed by the display image on the liquid crystal display, or the user may feel strange about the display of the information.

SUMMARY

In light of the above, an object of the present disclosure is to achieve appropriate anti-glare with visibility of a display image maintained in a display system including a display device that displays a display image with a reflected image as a mirror in a superimposed manner.

In order to achieve the object described above, according to the present disclosure, a display system for displaying a video of a display object with a reflected image in a superimposed manner includes a display device including a display and an optical device configured to control reflectance/transmittance of incident light; and a display control unit configured to display a display object on the display and an optical device control unit configured to change reflectance/transmittance of the optical device. The display emits image light of the display object, the optical device is disposed on a first direction side of the display so as to overlap a screen of the display when viewed in the first direction, the first direction being an emission direction of image light of the display, and the display control unit changes, according to the reflectance/transmittance of the optical device, a display color of a same display object on the display so as to reduce a change in color of the display object visually recognized by a user with a change in the reflectance/transmittance of the optical device.

In the display system, the display control unit may change the display color of the same display object on the display so that the lower the transmittance of the optical device is, the higher lightness is.

In this case, the display control unit may change the display color of the same display object on the display so that lightness of the display object visually recognized by the user is not changed with the change in the reflectance/transmittance of the optical device.

In the display system described above, the display may be a liquid crystal display including a backlight.

In the display system described above, the display device may be disposed at an upper part of a front windshield of a vehicle so that image light is emitted toward a rear direction of the vehicle.

In the display system described above, the display device may be disposed at a side part of a front door of a vehicle so that image light is emitted toward a rear direction of the vehicle.

In addition to such a display device mounted on a vehicle, it is possible to configure a display system having an anti-glare function by providing a light detection unit configured to detect intensity of light coming from behind the vehicle, and controlling, by the optical device control unit, according to the intensity of the light detected by the light detection unit, the reflectance/transmittance of the optical device so that the reflectance is decreased and the transmittance is increased as the intensity of the light is increased.

According to the display system described above, it is possible to achieve appropriate anti-glare by controlling the reflectance/transmittance of the optical device, and to maintain visibility of the display object by changing, according to the reflectance/transmittance of the optical device, a display color of a same display object on the display so as to reduce a change in color of the display object visually recognized by a user with a change in reflectance/transmittance of the optical device.

As described above, according to the present disclosure, it is possible to achieve appropriate anti-glare with visibility of a display image maintained, in a display system including a display device that displays a display image with a reflected image as a mirror in a superimposed manner.

BRIEF DESCRIPTION OF THE DRAWINGS

FIGS. 4A to 4C are diagrams that illustrate operations of a display device according to an embodiment of the present invention;

FIGS. 5A to 5K are diagrams that illustrate display examples of a display device according to an embodiment of the present invention.

DETAILED DESCRIPTION OF THE PREFERRED EMBODIMENTS

Hereinafter, an embodiment of the invention will be described.

Figure 1:
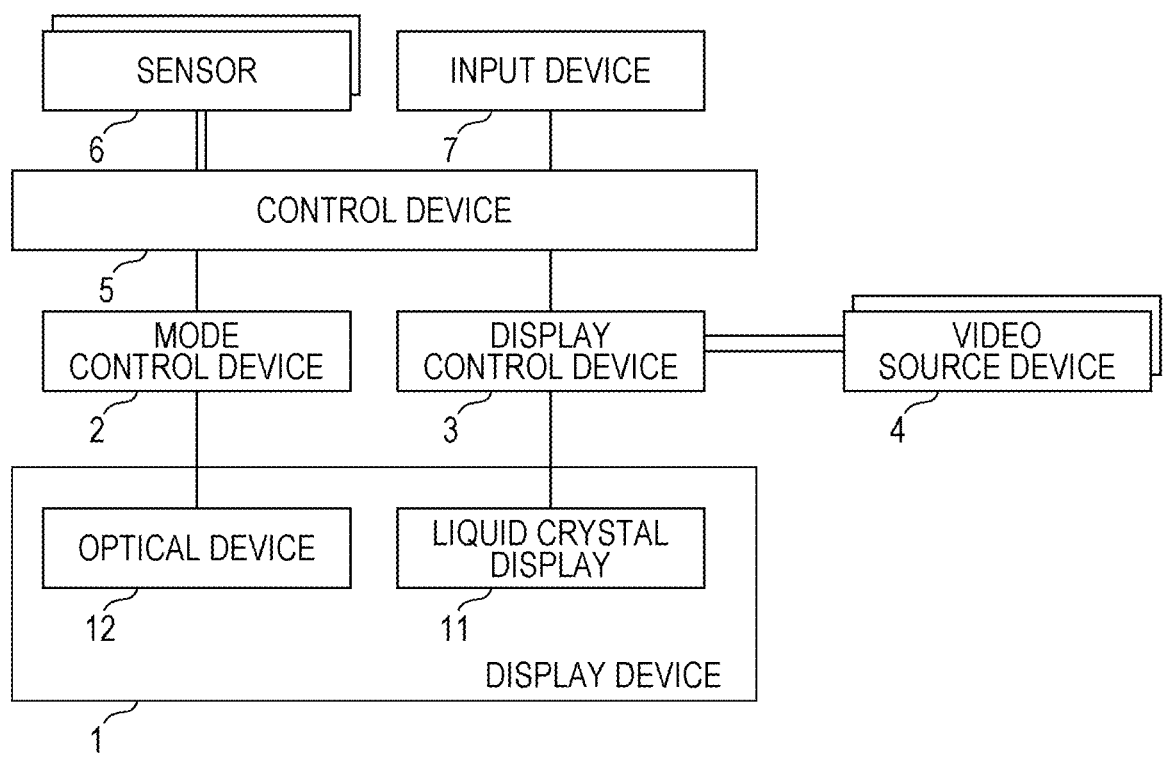
FIG. 1 is a block diagram that illustrates the configuration of a display system according to an embodiment of the present invention.

FIG. 1 illustrates the configuration of a display system according to the present embodiment.

The display system is a system mounted in a vehicle, and as illustrated in FIG. 1, the display system includes a display device 1, a mode control device 2, a display control device 3, one or more video source devices 4, a control device 5, a plurality of sensors 6, and an input device 7.

The display device 1 is a device that can be caused to selectively function as a mirror, a device for displaying a video, or a device for displaying a display image with a reflected image as the mirror in a superimposed manner, and the display device 1 includes a liquid crystal display 11 on which to display a video, and an optical device 12 that is disposed at a position through which image light emitted from the liquid crystal display 11 passes and is capable of controlling reflectance/transmittance of light.

Figure 2:
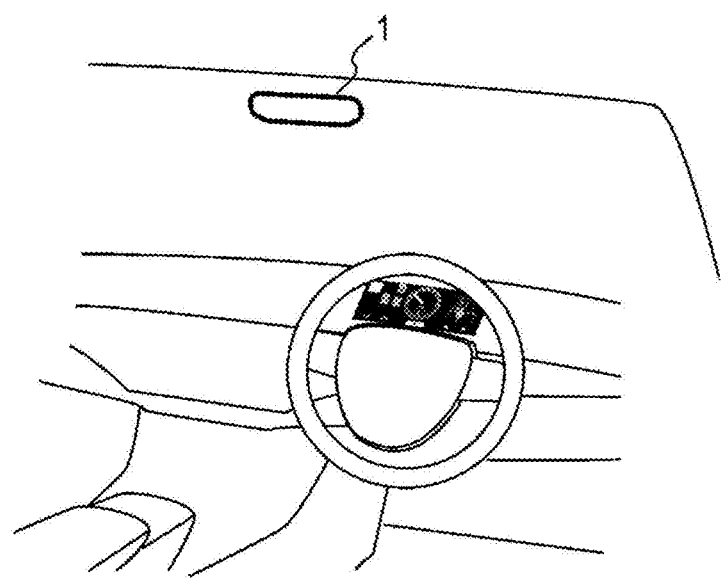
FIG. 2 is a diagram that illustrates an arrangement of a display device according to an embodiment of the present invention.

For example, as illustrated in FIG. 2, the display device 1 is disposed at a position where a rearview mirror has been conventionally provided on an upper part of a front windshield of a vehicle.

The display system has a display mode and a mirror mode as operation modes, and, in the display mode, the display device 1 is caused to function as a device for displaying a display image on the liquid crystal display 11, and, in the mirror mode, the display device 1 is caused to function as a mirror and also as a device for displaying a display image of the liquid crystal display 11 with a reflected image as the mirror in a superimposed manner.

Therefore, in the display mode, the display device 1 can be used as a display on which to display various types of information, and in the mirror mode, the display device 1 can be used as a rearview mirror having an information display function.

Note that the display device 1 may be disposed at a position where a wing mirror has been conventionally provided on a side part of a front door of a vehicle. In this case, in the display mode, the display device 1 can be used as a display on which to display various types of information, and in the mirror mode, the display device 1 can be used as a wing mirror having an information display function.

Returning back to FIG. 1, as the video source device 4, a back camera for capturing an image of the rear view of the vehicle and a device for outputting other videos are provided.

The plurality of sensors 6 include an illuminance sensor for detecting surrounding brightness, an optical sensor for detecting the intensity of light coming from behind the vehicle, and a sensor for detecting various states of the vehicle such as a traveling state of the vehicle and seat belt usage.

In the display mode, the display control device 3 displays a video output from the video source device 4 on the liquid crystal display 11 under the control of the control device 5, and, in the mirror mode, the display control device 3 displays a display object such as an icon 510 (FIG. 5) on the liquid crystal display 11 under the control of the control device 5.

The mode control device 2 adjusts the reflectance/transmittance of the optical device 12 under the control of the control device 5.

Next, the control device 5 switches between the display mode and the mirror mode of the display device 1 in accordance with a user operation or the like received by the input device 7.

In the display mode, the control device 5 performs processing for switching the video source device 4 that is the output source of the video displayed on the liquid crystal display 11 by the display control device 3 in accordance with a user operation or the like received by the input device 7.

In the mirror mode, during a period in which a detection value of the illuminance sensor 6 indicates that the surroundings are dark, the control device 5 sets an anti-glare level so as to be increased as the light intensity is increased, according to the intensity of light coming from behind as detected by the optical sensor 6. In the mirror mode, the control device 5 also sets the anti-glare level to the minimum level during a period in which the detection value of the illuminance sensor 6 indicates that the surroundings are not dark.

However, the surrounding brightness and the intensity of light coming from behind may be determined, in the control device 5, based on a video output by the back camera provided as the video source device 4.

In the display mode, the control device 5 controls the mode control device 2 to adjust the reflectance/transmittance of the optical device 12 and set at low reflectance/high transmittance so that the display device 1 functions as the device for displaying a display image on the liquid crystal display 11.

In the mirror mode, the control device 5 controls the mode control device 2 to adjust the reflectance/transmittance of the optical device 12 so that the display device 1 functions as the mirror and also as the device for displaying a display image on the liquid crystal display 11 with a reflected image 500 as the mirror in a superimposed manner, and so that the reflectance is decreased and the transmittance is increased as the anti-glare level is increased.

More specifically, during the mirror mode, at a low level of the anti-glare level, the mode control device 2 is controlled to adjust the reflectance/transmittance of the optical device 12 and set at high reflectance/low transmittance in a range where the transmittance is ensured to such an extent that the user can visually recognize the display image on the liquid crystal display 11. Then, the mode control device 2 is caused to control the reflectance/transmittance of the optical device 12 so that the reflectance is decreased and the transmittance is increased as the anti-glare level is increased. Here, as the reflectance of the optical device 12 is decreased and the transmittance is increased, the degree of anti-glare of the display device 1 in the mirror mode is increased.

Therefore, during the mirror mode, the higher the intensity of light coming from behind is, the greater the degree of anti-glare of the optical device 12 is.

Figure 3:
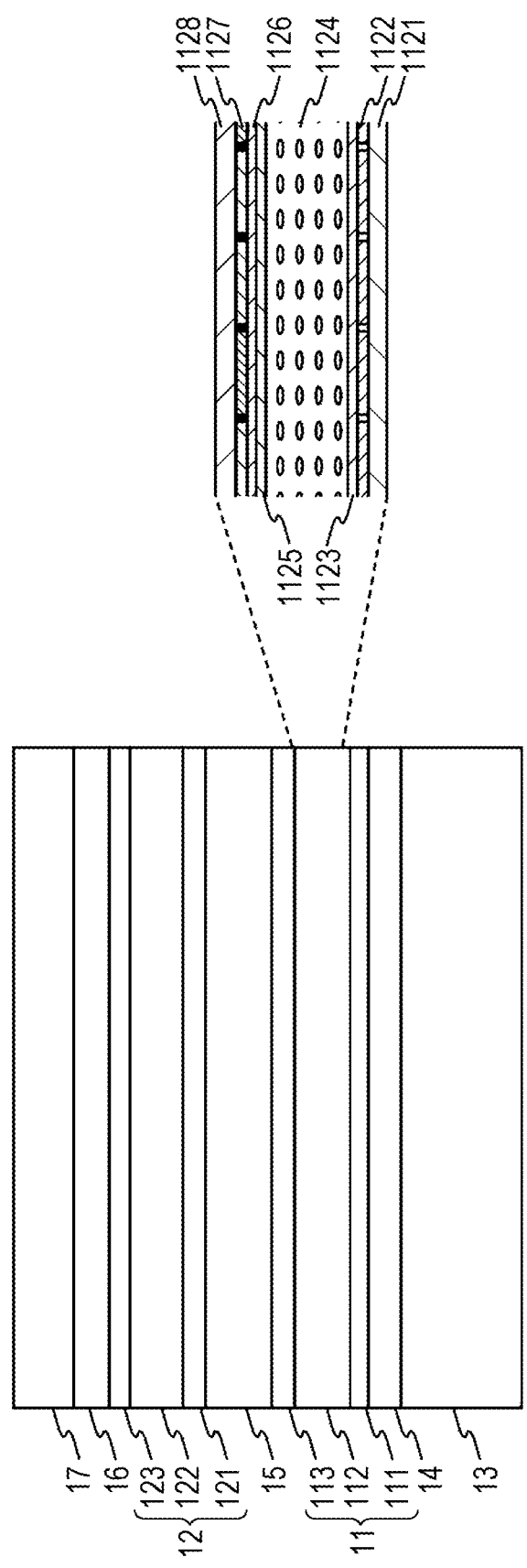
FIG. 3 is a diagram that schematically illustrates the configuration of a display device according to an embodiment of the present invention.

Next, FIG. 3 schematically illustrates the configuration of the display device 1.

As illustrated in FIG. 3, the display device 1 has, from the back to the front thereof, a structure in which are stacked a backlight 13 for emitting display illumination light, an air gap or an optical clear adhesive (OCA: optical clear adhesive sheet) 14, a backlight polarizing plate 111, a display liquid crystal panel 112, an image light polarizing plate 113, an air gap or an OCA 15, a reflective polarizing plate 121, a mode switching liquid crystal panel 122, an external light polarizing plate 123, an air gap or an OCA 16, and a cover glass 17.

The backlight polarizing plate 111, the display liquid crystal panel 112, and the image light polarizing plate 113 constitute the liquid crystal display 11.

In the liquid crystal display 11, the direction of a polarizing transmission axis of the image light polarizing plate 113 is set to a first direction, and the direction of a polarizing transmission axis of the backlight polarizing plate 111 is set to a second direction that is orthogonal to the first direction. Only a component of linearly polarized light in the second direction of the display illumination light emitted from the backlight 13 passes through the backlight polarizing plate 111 to enter the display liquid crystal panel 112. In the display liquid crystal panel 112, a vibration plane of the display illumination light is adjusted to a desired direction for each pixel, colored, and emitted to the image light polarizing plate 113. The image light polarizing plate 113 transmits only a component of linearly polarized light in the first direction of the display illumination light entering from the display liquid crystal panel 112, and emits the resultant as image light representing a video.

Further, the display liquid crystal panel 112 has, from the back to the front of the display device 1, a structure in which are stacked a back transparent substrate 1121, a pixel electrode 1122, a back orientation film 1123, a liquid crystal layer 1124, a front orientation film 1125, a counter electrode 1126, a color filter and black matrix 1127, and a front transparent substrate 1128.

The pixel electrode 1122 and the counter electrode 1126 control, for each pixel, an effective voltage applied to the liquid crystal layer 1124, so that the orientation of the liquid crystal can be controlled for each pixel to adjust the vibration plane of the display illumination light emitted from the liquid crystal layer 1124 and set at a desired direction. Here, the display illumination light emitted from the liquid crystal layer 1124 is colored for each pixel by the color filter 1127 and emitted to the image light polarizing plate 113.

In the display device 1, the reflective polarizing plate 121, the mode switching liquid crystal panel 122, and the external light polarizing plate 123 constitute the optical device 12.

The polarizing transmission axes of the external light polarizing plate 123 and the reflective polarizing plate 121 are set to the first direction which is the same as that of the polarizing transmission axis of the image light polarizing plate 113 of the liquid crystal display 11. The reflective polarizing plate 121 is an optical device that transmits linearly polarized light in the direction of the polarizing transmission axis and reflects linearly polarized light in a direction orthogonal to the polarizing transmission axis, and since the polarizing transmission axis is the first direction herein, the reflective polarizing plate 121 transmits linearly polarized light in the first direction and reflects linearly polarized light in the second direction that is the direction orthogonal to the first direction.

The mode switching liquid crystal panel 122 can control the orientation of the liquid crystal in the mode switching liquid crystal panel 122, adjust the vibration plane of the linearly polarized light incident on the mode switching liquid crystal panel 122 and set at a desired direction to emit the resultant.

The operations of the display device 1 in the display mode and the mirror mode will now be described.

First, FIG. 4A illustrates an operation of the display device 1 in the display mode with the cover glass 17, the air gap, and the OCA not involved in the operation omitted.

In the display mode, as illustrated in FIG. 4A, the mode switching liquid crystal panel 122 is controlled by the mode control device 2 so as to emit linearly polarized light while maintaining the vibration plane of the incident linearly polarized light as it is.

A component of the linearly polarized light in the first direction of external light that has entered the external light polarizing plate 123 passes through the external light polarizing plate 123 having the polarizing transmission axis in the first direction, and passes through the mode switching liquid crystal panel 122 with the direction of the vibration plane maintained in the first direction. The linearly polarized light in the first direction that has passed through the mode switching liquid crystal panel 122 passes through the reflective polarizing plate 121 having the polarizing transmission axis in the first direction, enters the liquid crystal display 11, and most of the linearly polarized light is absorbed therein.

On the other hand, as described above, the image light containing only the linearly polarized light in the first direction is emitted from the liquid crystal display 11. The image light emitted from the liquid crystal display 11 passes through the reflective polarizing plate 121 having the polarizing transmission axis in the first direction to enter the mode switching liquid crystal panel 122. The image light that has entered the mode switching liquid crystal panel 122 passes through the mode switching liquid crystal panel 122 with the direction of the vibration plane maintained in the first direction, directly passes through the external light polarizing plate 123 having the polarizing transmission axis in the first direction, and is emitted to the outside. The image light emitted to the outside is then used to display a video.

Next, FIG. 4B illustrates an operation of the display device 1 for a case where the mode control device 2 controls the mode switching liquid crystal panel 122 so as to rotate, by 90 degrees, a vibration plane of incident linearly polarized light with the cover glass 17, the air gap, and the OCA not involved in the operation omitted.

In this case, a component of the linearly polarized light in the first direction of external light that has entered the external light polarizing plate 123 passes through the external light polarizing plate 123 having the polarizing transmission axis in the first direction, the direction of the vibration plane is rotated by 90 degrees in the mode switching liquid crystal panel 122 to enter the reflective polarizing plate 121 as the linearly polarized light in the second direction. Since the external light entering from the mode switching liquid crystal panel 122 is linearly polarized light in the second direction that is orthogonal to the polarizing transmission axis in the first direction, the reflective polarizing plate 121 reflects all of the external light. The reflected light of the linearly polarized light in the second direction reflected by the reflective polarizing plate 121 is incident on the mode switching liquid crystal panel 122, the vibration plane of the reflected light is rotated by 90 degrees in the mode switching liquid crystal panel 122, the reflected light is emitted to the external light polarizing plate 123 as the linearly polarized light in the first direction, and directly passes through the external light polarizing plate 123 having the polarizing transmission axis in the first direction, and is emitted to the outside. Thus, the function of the display device 1 as the mirror is realized by the reflected light emitted to the outside.

On the other hand, in this case, even if the display is performed in the liquid crystal display 11, the image light of the linearly polarized light in the first direction emitted from the liquid crystal display 11 passes through the reflective polarizing plate 121, the vibration plane of the image light is rotated by 90 degrees in the mode switching liquid crystal panel 122, the image light enters the external light polarizing plate 123 as the linearly polarized light in the second direction, is blocked by the external light polarizing plate 123, and the video on the liquid crystal display 11 is not displayed and output externally.

Next, FIG. 4C illustrates an operation of the display device 1 in the mirror mode with the cover glass 17, the air gap, and the OCA not involved in the operation omitted.

In the mirror mode, the mode switching liquid crystal panel 122 is controlled to have a state between FIGS. 4A and 4B. Specifically, the mode control device 2 controls the mode switching liquid crystal panel 122 so as to rotate the vibration plane of incident linearly polarized light by an angle θ determined according to the anti-glare level within a range of θa (θa>0) degrees or more and θb (θb<90) degrees or less.

In the mirror mode in which the mode switching liquid crystal panel 122 is controlled as described above, a component of linearly polarized light in the first direction of external light that has entered the external light polarizing plate 123 passes through the external light polarizing plate 123 having the polarizing transmission axis in the first direction, the direction of the vibration plane is rotated by θ in the mode switching liquid crystal panel 122 to enter the reflective polarizing plate 121 as the linearly polarized light in a direction between the first direction and the second direction.

The reflective polarizing plate 121 reflects the component of the linearly polarized light in the second direction of the external light entering from the mode switching liquid crystal panel 122 and transmits the component of the linearly polarized light in the first direction of the incident external light. Thus, the reflective polarizing plate 121 reflects a part of the external light entering from the mode switching liquid crystal panel 122 and transmits a part thereof.

The reflected light of the linearly polarized light in the second direction reflected by the reflective polarizing plate 121 is incident on the mode switching liquid crystal panel 122, the vibration plane of the reflected light is rotated by θ in the mode switching liquid crystal panel 122 and emitted to the external light polarizing plate 123, and the external light polarizing plate 123 emits, to the outside, a component of the linearly polarized light in the first direction of the reflected light entering from the mode switching liquid crystal panel 122. Thus, the function of the display device 1 as the mirror is also realized by the reflected light emitted to the outside. Further, it is possible to change the reflectance of the optical device 12 according to the angle θ of rotation of the vibration plate in the mode switching liquid crystal panel 122 to achieve anti-glare of the display device 1 according to the anti-glare level.

On the other hand, the external light of the linearly polarized light in the first direction that has passed through the reflective polarizing plate 121 enters the liquid crystal display 11, and thereafter, most of the external light is absorbed therein.

On the other hand, the image light of the linearly polarized light in the first direction emitted from the liquid crystal display 11 passes through the reflective polarizing plate 121, the vibration plane of the image light is rotated by θ in the mode switching liquid crystal panel 122 and the image light enters the external light polarizing plate 123, and the external light polarizing plate 123 emits, to the outside, a component of the linearly polarized light in the first direction of the image light entering from the mode switching liquid crystal panel 122.

Therefore, in the mirror mode, the image reflected by the reflective polarizing plate 121 and the video displayed on the liquid crystal display 11 superimposed on each other are visually recognized by the user.

The transmittance of the optical device 12 of the image light emitted from the display device 1 to the outside changes according to the angle θ of rotation of the vibration plane in the mode switching liquid crystal panel 122, and the transmittance thereof is decreased as the reflectance of the optical device 12 is increased, and is increased as the reflectance of the optical device 12 is decreased. Therefore, the transmittance of the liquid crystal display 11 of the image light emitted from the display device 1 to the outside changes according to the anti-glare level.

As described above, in the mirror mode, the control device 5 controls display of the display object of the display control device 3 on the liquid crystal display 11.

FIGS. 5A to 5B illustrate a case where the display object is not displayed in the mirror mode.

In this case, as illustrated in FIG. 5A, the control device 5 controls the display control device 3 to display a black screen on the liquid crystal display 11. FIG. 5B illustrates a state of the display device 1 visually recognized by the user at this time, and in this case, only the reflected image 500 showing the rear view is displayed in the display device 1.

Next, FIGS. 5C to 5E illustrate a case where the display object is displayed in the mirror mode.

Here, a case where the display object is an icon 510 to notify the user of an unfastened seat belt is described as an example.

In this case, for example, when the sensor 6 detects that the driver has not fastened the seat belt while the vehicle is traveling, the control device 5 controls the display control device 3 to display, on the liquid crystal display 11 as illustrated in FIG. 5D, an image in which the icon 510 to notify that the driver has not fastened the seat belt illustrated in FIG. 5C is arranged on a black background. FIG. 5E illustrates a state of the display device 1 visually recognized by the user at this time, and in this case, the reflected image 500 showing the rear view and the icon 510 superimposed on each other are displayed in the display device 1 in response to the operation of the display device 1 in the mirror mode described above.

As described above, in the mirror mode, the reflectance/transmittance of the optical device 12 is changed according to the anti-glare level, and accordingly, the transmittance of the liquid crystal display 11 of the image light emitted from the display device 1 to the outside also changes.

Therefore, in a case where a display color of the icon 510 is constant regardless of the anti-glare level, the icon 510 is visually recognized, by the user, in different colors according to the anti-glare level.

In light of the above, in the mirror mode, the control device 5 controls the display control device 3 to change, according to the reflectance/transmittance of the optical device 12 under control, the display color of the icon 510 so that the icon 510 is visually recognized as a similar color regardless of the anti-glare level.

In a case where the change in reflectance/transmittance of the optical device 12 relates only to the lightness of the icon 510 visually recognized, the control device 5 performs the following control.

Specifically, the control device 5 calculates a lightness adjustment rate k (%), which is a rate of lightness adjustment to the display color of the icon 510, so that in a case where the reflectance/transmittance of the optical device 12 is changed with a change in anti-glare level, the user can visually recognize the icon 510 of the same color based on the post-change transmittance, and sets the lightness adjustment rate k (%) in the display control device 3.

Then, the display control device 3 calculates, as the current display color of the icon 510, a color obtained by adjusting the lightness of the basic display color of the icon 510 determined in advance by the ratio represented by the lightness adjustment rate k (%), and displays the icon 510 in the current display color on the liquid crystal display 11. Note that the basic display color of the icon 510 is a color represented by color data (RGB or the like) of the icon 510.

Here, the calculation of the lightness adjustment rate k (%) according to the transmittance and the calculation of the current display color according to the lightness adjustment rate k (%) are performed such that the lower the transmittance is, the higher the lightness of the current display color is.

Figures 6A, 6B:
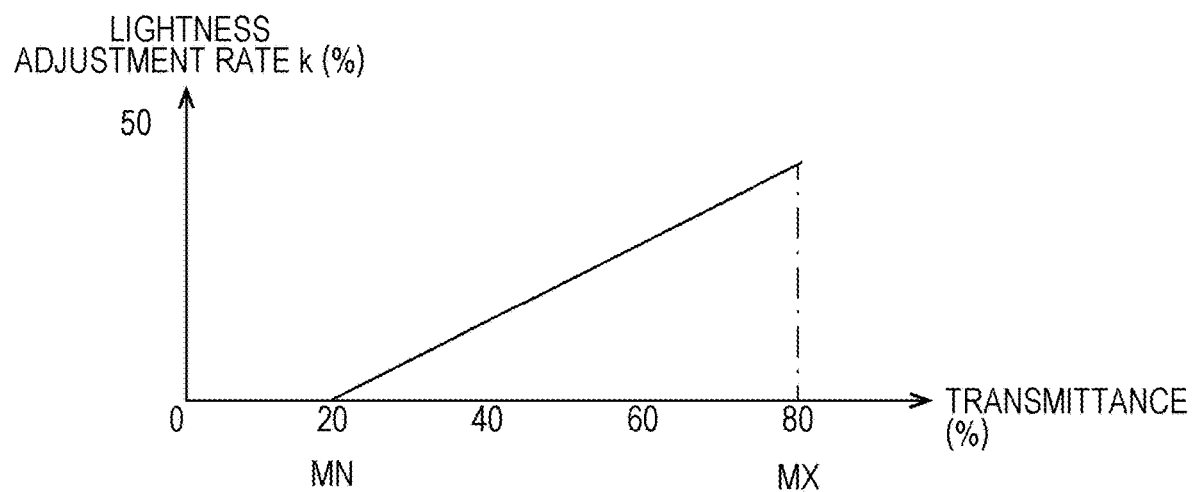
FIGS. 6A and 6B are diagrams that illustrate a method for setting a display object color during anti-glare according to an embodiment of the present invention.

More specifically, for example, as FIG. 6A shows the relationship between the transmittance of the optical device 12 and the lightness adjustment rate k (%), the lightness adjustment rate (%) is calculated according to the transmittance such that, in a case where the minimum transmittance used in the mirror mode is MN % (approximately 20% in FIG. 6A) and the maximum transmittance is MX % (approximately 80% in FIG. 6A), the lightness adjustment rate (%) is 0% at a transmittance of MN %, and the lightness adjustment rate (%) is increased as the transmittance approaches MX %.

In the display control device 3, for example, the current display color is so set to satisfy the following equation:

$$\text{current display color lightness} = \text{basic display color lightness} \times \{1-(k/100)\}.$$

Further, in this case, the basic display color of the icon 510 is set to a color that is visually recognized by the user as a color of the icon 510 intended by a designer at a transmittance of the maximum MN % when the icon 510 is displayed in the color on the liquid crystal display 11. The designer selects the basic display color in advance, and sets color data of the selected basic display color as the color data of the icon 510.

In the mirror mode, the relationship between the transmittance of the optical device 12 and the lightness adjustment rate k (%) in FIG. 6A is preset by an experiment or calculation as the relationship in which the same color (color intended by the designer) as that for a transmittance of the maximum MN % is visually recognized by the user by displaying, on the liquid crystal display 11, the icon 510 of the current display color determined as described above at each transmittance between MX % and MN %.

In the calculation of the lightness adjustment rate k (%) based on the transmittance of the optical device 12 in the control device 5, the relationship between the transmittance and the lightness adjustment rate k (%) as illustrated in FIG. 6A is preset in the control device 5, and the lightness adjustment rate k (%) is calculated according to the relationship set in the control device 5.

Here, instead of calculating the lightness adjustment rate k (%) in the control as described above and calculating the current display color of the icon 510 using the lightness adjustment rate k (%) in the display control device 3, the current display color of the icon 510 may be calculated as follows.

Specifically, in a case where the reflectance/transmittance of the optical device 12 is changed with a change in anti-glare level, the control device 5 notifies the display control device 3 of the post-change transmittance.

As illustrated in FIG. 6B, a table is preset in the display control device 3 for each color used as the basic display color of the icon 510, and the table registers, for each transmittance, a color to be used as the current display color of the icon 510 for the corresponding transmittance.

Then, in the table corresponding to the basic display color of the icon 510 to be displayed, the display control device 3 calculates, as the current display color, a color registered for the transmittance notified by the control device 5 and displays the icon 510 in the current display color on the liquid crystal display 11.

In the table of each basic display color as illustrated in FIG. 6B, the color to be used as the current display color registered for each transmittance is a color that is visually recognized by the user as a color of the icon 510 intended, by the designer, to be visually recognized by the user at the corresponding transmittance of the optical device 12 by displaying the icon 510 in that color. Further, the color to be used as the current display color has higher lightness as the transmittance is lower.

A display example of the icon 510 in response to the operation of the control device 5 and the display control device 3 in the mirror mode as described above will now be described.

FIGS. 5C to 5E illustrate a case of mirror mode, low anti-glare level, and high reflectance/low transmittance, FIGS. 5F to 5H illustrate a case of mirror mode, average anti-glare level, and average reflectance/average transmittance, and FIGS. 5I to 5K illustrate a case of mirror mode, high anti-glare level, low reflectance/high transmittance.

FIGS. 5C, 5F, and 5I illustrate the icon 510 of the current display color in each case. As illustrated, the higher the transmittance is, the lower the lightness of the current display color of the icon 510 is.

Therefore, as illustrated in FIGS. 5D, 5G, and 5I, the icon 510 of the current display color in each case is so displayed, on the liquid crystal display 11, that the higher the transmittance is, the lower the lightness is.

As FIG. 5E, FIG. 5H, and FIG. 5K each illustrates a state of the display device 1 visually recognized by the user, the icon 510 displayed on the liquid crystal display 11 is displayed in such a manner that the reflected image 500 showing the rear view and the icon 510 are displayed in a superimposed manner in the display device 1.

Here, the lower the transmittance of the optical device 12 is, the smaller the amount of light passing through the optical device 12 is, and the icon 510 visually recognized by the user has lightness lower than the current display color of the icon 510 displayed on the liquid crystal display 11.

On the other hand, as described above, the icon 510 is so displayed on the liquid crystal display 11 that the lower the transmittance is, the higher the lightness is.

Therefore, the icon 510 is visually recognized by the user as the icon 510 having substantially similar color/lightness regardless of the anti-glare level and the reflectance/transmittance of the optical device 12, as illustrated in the appearance of the display device 1 visually recognized in the case of low anti-glare level and high reflectance/low transmittance of FIG. 5E, as illustrated in the appearance of the display device 1 visually recognized in the case of average anti-glare level and average reflectance/average transmittance of FIG. 5H, and as illustrated in the appearance of the display device 1 visually recognized in the case of high anti-glare level, low reflectance/high transmittance of FIG. 5K.

In the embodiment described above, the case where the change in reflectance/transmittance of the optical device 12 relates only to the change in lightness of the icon 510 visually recognized is described; however, in a case where the change in reflectance/transmittance of the optical device 12 also relates to a change in color attributes other than the lightness such as hue and saturation, in the embodiment described above, the current display color may be set such that a change associated with the change in reflectance/transmittance from the basic display color is canceled for all color attributes relating to the change in reflectance/transmittance.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A display system for displaying video of a display object with a reflected image in a superimposed manner, the display system comprising:
 a display device including a display and an optical device configured to control reflectance/transmittance of incident light; and
 a display control unit configured to display a display object on the display and an optical device control unit configured to change reflectance and transmittance of the optical device, wherein
 the display emits image light of the display object,
 the optical device is disposed on a first direction side of the display so as to overlap a screen of the display when viewed in the first direction, the first direction being an emission direction of image light of the display, and
 the display control unit changes, according to the reflectance and transmittance of the optical device, a display color of the display object on the display so as to reduce a change in color of the display object visually recognized by a user with a change in the reflectance and transmittance of the optical device,
 the display device is disposed at an upper part of a front windshield of a vehicle so that image light is emitted toward a rear direction of the vehicle, and
 a light detection unit configured to detect intensity of light coming from behind the vehicle, wherein the optical device control unit controls, according to the intensity of the light detected by the light detection unit, the reflectance and transmittance of the optical device so that the reflectance is decreased and the transmittance is increased as the intensity of the light is increased.

2. The display system according to claim 1, wherein
 the display control unit changes the display color of the display object on the display so that the lower the transmittance of the optical device is, the higher lightness is.

3. The display system according to claim 2, wherein
 the display control unit changes the display color of the display object on the display so that lightness of the display object visually recognized by the user is not changed with the change in the reflectance and transmittance of the optical device.

4. The display system according to claim 1, wherein
 the display is a liquid crystal display including a backlight.

5. A display system for displaying video of a display object with a reflected image in a superimposed manner, the display system comprising:
 a display device including a display and an optical device configured to control reflectance/transmittance of incident light; and
 a display control unit configured to display a display object on the display and an optical device control unit configured to change reflectance and transmittance of the optical device, wherein
 the display emits image light of the display object,
 the optical device is disposed on a first direction side of the display so as to overlap a screen of the display when viewed in the first direction, the first direction being an emission direction of image light of the display, and
 the display control unit changes, according to the reflectance and transmittance of the optical device, a display color of the display object on the display so as to reduce a change in color of the display object visually recognized by a user with a change in the reflectance and transmittance of the optical device,
 the display device is disposed at a side part of a front door of a vehicle so that image light is emitted toward a rear direction of the vehicle, and
 a light detection unit configured to detect intensity of light coming from behind the vehicle, wherein the optical device control unit controls, according to the intensity of the light detected by the light detection unit, the reflectance and transmittance of the optical device so that the reflectance is decreased and the transmittance is increased as the intensity of the light is increased.

6. The display system according to claim 5, wherein
 the display control unit changes the display color of the display object on the display so that the lower the transmittance of the optical device is, the higher lightness is.

7. The display system according to claim 6, wherein
 the display control unit changes the display color of the display object on the display so that lightness of the display object visually recognized by the user is not changed with the change in the reflectance and transmittance of the optical device.

8. The display system according to claim 5, wherein the display is a liquid crystal display including a backlight.

* * * * *